(No Model.)

H. STONE.
NUT LOCK.

No. 296,361. Patented Apr. 8, 1884.

WITNESSES
Wm. M. Monroe.
Geo. W. King

INVENTOR
Hiram Stone
by Leggett and Leggett ATTORNEYS

UNITED STATES PATENT OFFICE.

HIRAM STONE, OF CLEVELAND, OHIO.

NUT-LOCK.

SPECIFICATION forming part of Letters Patent No. 296,361, dated April 8, 1884.

Application filed January 31, 1884. (No model.)

*To all whom it may concern:*

Be it known that I, HIRAM STONE, of Cleveland, in the county of Cuyahoga and State of Ohio, have invented certain new and useful Improvements in Nut-Locks; and I do hereby declare the following to be a full, clear, and exact description of the invention, such as will enable others skilled in the art to which it pertains to make and use the same.

My invention relates to improvements in nut-locks designed more especially for securing joints of railroad-tracks.

The object of my invention is to provide a slotted bolt and key, by means of which the nut may be locked.

A further object is to provide for taking up the slack in the bolt as the parts wear or stretch.

A further object is to provide a sleeve intermediate between the key and nut, so that the slot may be beyond the threaded part of the bolt, so as not to weaken the bolt.

A further object is to provide a slot with diagonal end walls that will fit the taper of the key.

With these objects in view, my invention consists in certain features of construction and in combination of parts hereinafter described, and pointed out in the claims.

Figure 1:
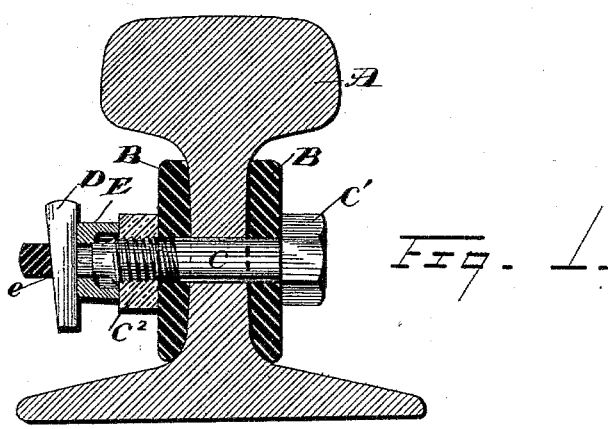
Figure 2:
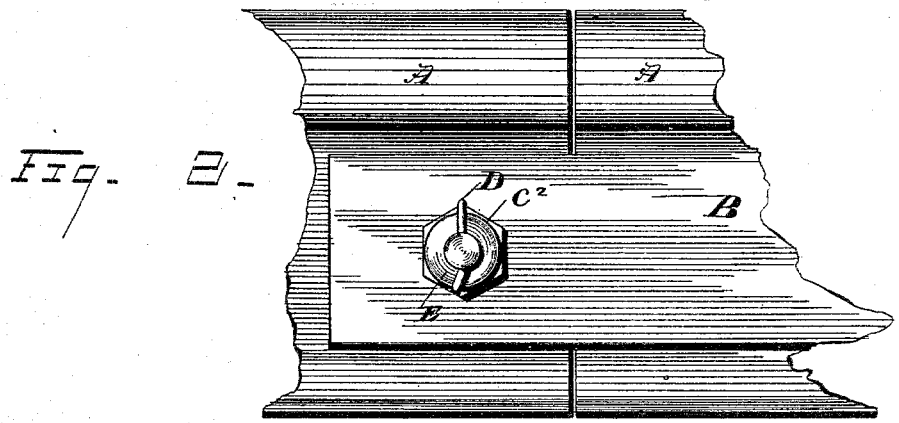

In the accompanying drawings, Figure 1 is a vertical section of a rail and fish-plate and a longitudinal section of the bolt, showing my improved nut-lock. Fig. 2 is a side elevation of a portion of the rail and fish-plate and an end view of the bolt and attachments.

A represents the rail; B, the fish-plate; C, the bolt, provided with the head C' and the nut C². Beyond the threaded part the bolt is reduced in size, as shown, so as to avoid the necessity of threading this part. A slot is punched through this part, so as to leave diagonal walls, as shown at c, so that the outer end wall will fit the taper of the key D.

E is a sleeve that butts against the nut C², and is supported by the key, as shown. The bore of the inner end of the sleeve is of sufficient size to pass over the threaded part of the bolt, while the bore at the outer end is an easy fit on the slotted part of the bolt. The nut C² is screwed up and the key driven in tight, forcing the sleeve against the nut, securely locking it. The end of the key is then bent, as shown in Fig. 2, so that it cannot "back out." The thread is cut some distance on the bolt, and the length of the slot and of the longer bore in the sleeve are such that any slack likely to occur by reason of the wear of the parts may be taken up. When the nut requires to be tightened, it can be done without first disturbing the key, after which the key is driven in still farther and the end again bent, firmly securing the nut in the bolt. The key is preferably of soft steel, so that it can easily be straightened when it is necessary to remove it—as, for instance, in changing rails. It will be seen that, as the slot in the bolt is beyond the threaded part, the bolt is not weakened thereby.

This nut-lock is simple, durable, inexpensive, and effective, and will be found well adapted for the purpose shown.

What I claim is—

1. In a nut-lock, the combination, with a bolt provided with a head, a threaded portion, and a smooth portion of reduced diameter, having a diagonal slot formed therein, of a tapering key adapted to fit within the diagonal slot in the bolt, and a sleeve located on the bolt between the key and nut, said sleeve being chambered at one end to pass over the threaded portion of the bolt, the opposite end of the sleeve engaging the smooth portion of the bolt, substantially as set forth.

2. In a nut-lock, a bolt provided with a longitudinal slot beyond the threaded part, in combination with the washer E and the key D, and the parts so arranged that the nut may be successively tightened and locked, as may be required from time to time, as the parts wear or stretch, substantially as set forth.

3. In a nut-lock, the bolt C, provided with the nut C² and the sleeve E, in combination with the key D, of such width, length, and taper as required to "follow up" the nut and sleeve for some distance, and of such thickness and flexibility that the key may be bent to prevent its "backing out" or becoming loosened, substantially as set forth.

In testimony whereof I sign this specification, in the presence of two witnesses, this 26th day of January, 1884.

HIRAM STONE.

Witnesses:
CHAS. H. DORER,
ALBERT E. LYNCH.